Dec. 20, 1960   B. TOONE   2,964,907
COMBUSTION STABILISING DEVICE FOR COMBUSTION EQUIPMENT
Filed Nov. 10, 1958   2 Sheets-Sheet 1
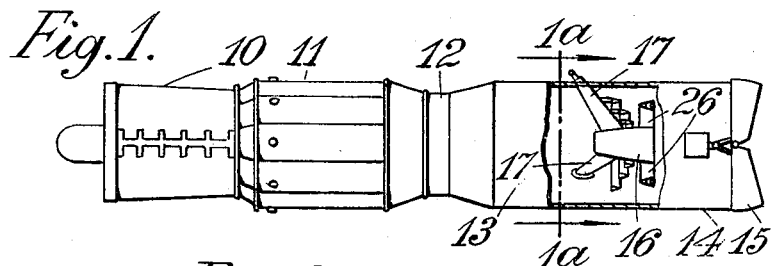
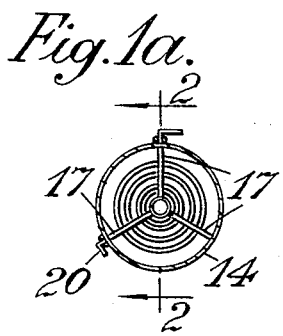
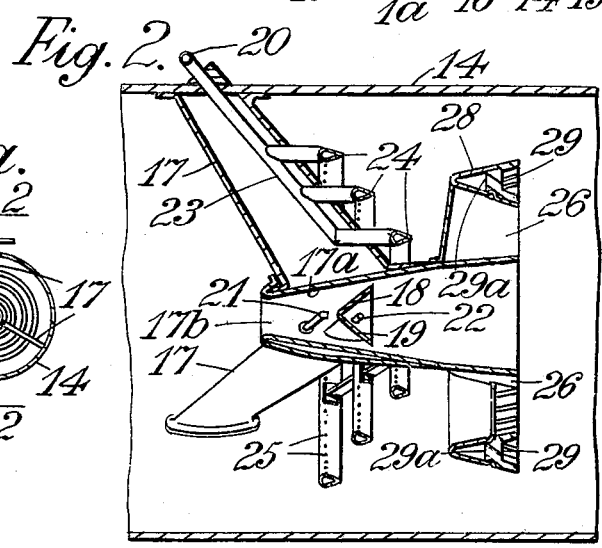
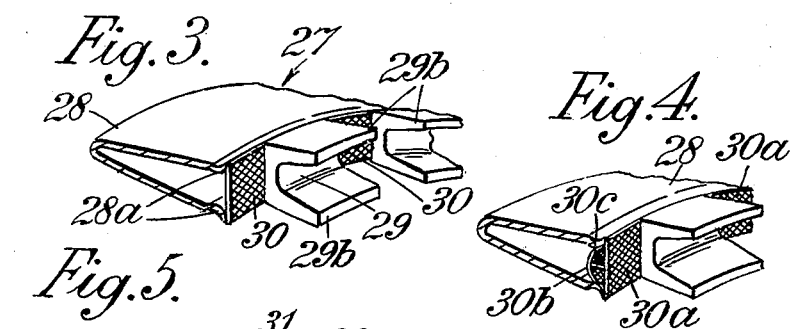
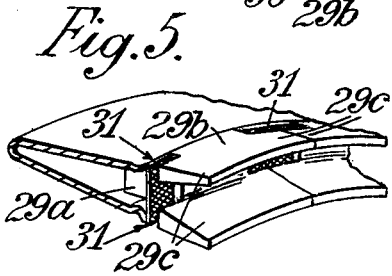
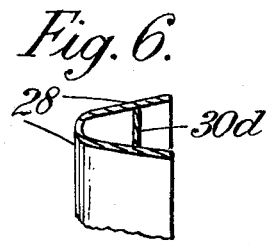

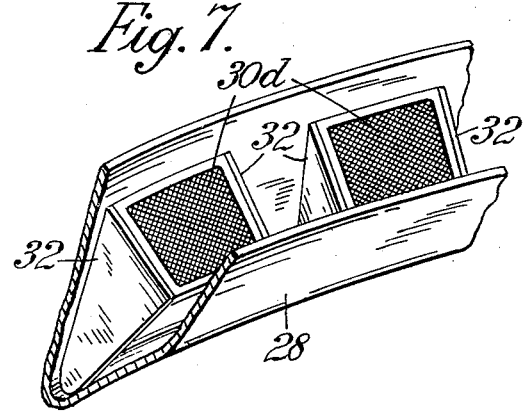
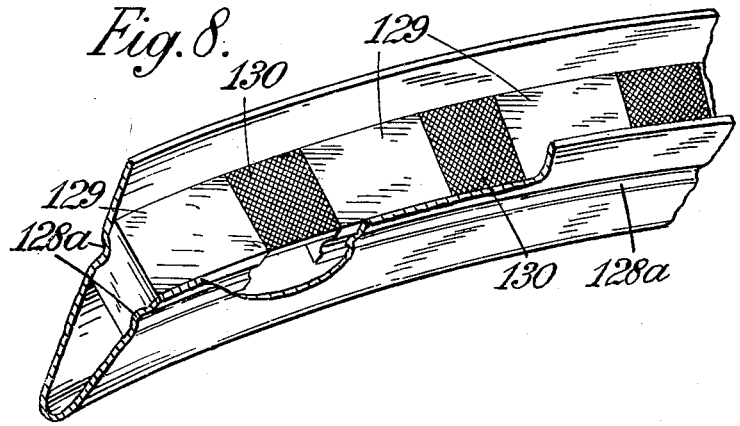

2,964,907
COMBUSTION STABILISING DEVICE FOR COMBUSTION EQUIPMENT

Brian Toone, Littleover, Derby, England, assignor to Rolls-Royce Limited, Derby, England, a British company Filed Nov. 10, 1958, Ser. No. 773,048

Claims priority, application Great Britain Nov. 15, 1957

11 Claims. (Cl. 60—39.72)

This invention comprises improvements in or relating to combustion equipment of the class in which fuel is delivered into a combustion space and combustion-supporting gas to be burnt with the fuel flows through the combustion space with a high velocity. Such combustion equipment is used for example in connection with gas-turbine engines which comprise main combustion equipment for heating compressed air prior to passage through a turbine and which may also comprise reheat combustion equipment wherein the exhaust gases leaving a turbine are reheated prior to passing through another turbine, or, in the case of a jet propulsion engine, before flowing to atmosphere as a propulsive jet. In the latter case, the reheat combustion occurs in a section of the jet pipe.

The operating conditions within combustion equipment of the class above specified vary widely, especially where the combustion equipment forms part of an aircraft engine, and difficulty is often experienced in maintaining a flame. For instance flame stability is difficult to achieve when the pressure within the combustion equipment is low.

This invention has for an object to provide improved means for stabilising combustion within combustion equipment of the class specified.

According to the present invention, a combustion stabilising device for use with combustion equipment of the class specified comprises means adapted to produce in the gas flow a zone wherein the velocity of the combustible gaseous mixture is materially reduced and a combustion-promoting catalytic element of platinum or platinum-containing alloy, or a plurality of such elements, associated with said means and within said zone.

In use of a combustion stabilising device of this invention, the catalytic combustion-promoting element becomes heated due to the combustion of fuel and improves the relighting limits, i.e. the limits of fuel/air ratio and of jet pipe pressure within which relighting of the gaseous mixture in the jet pipe is possible. In tests it has been found that combustion relighting limits are markedly improved under adverse conditions, such as low pressure in the combustion space or low fuel/air ratio, by use of the stabilising device of this invention.

The means producing the zone of reduced gas velocity may be in the form of an annular member and the catalytic elements may be segmental and spaced apart around the annular member. In one such arrangement, the stabilising device comprises an annular V-section gutter member, and a series of ceramic elements and a series of catalytic combustion-promoting elements, the ceramic elements alternating around the annular member with the combustion-promoting elements. The ceramic elements and combustion-promoting elements may either be set back from the downstream edges of the V-section gutter member, or be positioned at these edges and in the latter case ceramic elements may have axial flanges which project downstream into the zone and the flanges may be extended circumferentially over the edges of the combustion-promoting elements.

In another such construction, the stabilising member comprises a V-section gutter and the catalytic elements are set back from the downstream edges of the sides of the gutter and spaced away from its base. There may also be provided metal pieces which extend from the circumferentially spaced edges of the catalytic elements to the base of the gutter. The catalytic combustion-promoting elements are preferably formed from gauze or expanded metal or perforated sheet and may comprise one or more layers of such material spaced apart.

Some embodiments of this invention will now be described with reference to the accompanying drawings, in which:

Figure 1 is a diagrammatic illustration of a gas-turbine jet propulsion engine fitted with reheat combustion equipment, Figure 1a is a section on line 1a—1a of Figure 1, Figure 2 is a section on line 2—2 of Figure 1, drawn to a larger scale and showing the reheat combustion equipment, Figure 3 is a detail of a stabilising device forming part of the apparatus shown in Figure 2, Figures 4 and 5 are details corresponding to Figure 3 of modified forms of stabilising device, Figure 6 shows part of yet another form of stabilising device, Figures 7 and 8 are views corresponding to Figure 3 of two further forms of stabilising device.

The engine shown in Figure 1 comprises a compressor 10 which takes in air from atmosphere and compresses it, main combustion equipment 11 to which the compressed air is delivered to be burnt with liquid fuel, a turbine 12 which receives the products of combustion and drives the compressor 10, and an exhaust assembly 13 into which the exhaust gases from the turbine 12 are delivered.

The exhaust assembly 13 comprises a jet-pipe 14 and a variable-area propulsion nozzle 15 at the outlet end of the jet pipe 14.

The engine also comprises reheat combustion equipment 16 disposed within the jet-pipe 14 so that the exhaust gases from the turbine may be heated before leaving the engine so as to increase the thrust developed by the exhaust gas jet.

The reheat combustion equipment comprises three hollow struts 17 extending across the jet pipe 14 and carrying a casing 17a within which is supported a conical baffle 18 which is disposed coaxially with the jet pipe 14 with its apex upstream. The casing 17a is open at its upstream end 17b and thus part of the gases flowing in the jet pipe 14 flows through the casing 17a and round the baffle 18 and leave the baffle and casing in a downstream direction.

One strut 17 houses a fuel supply pipe 20 leading to a pilot fuel injector 21 adjacent the apex of the baffle 18. The injector 21 delivers fuel in the downstream direction on to the apex of baffle 18 and this fuel mixes with the exhaust gases and in part at least is carried round the downstream edge of the baffle 18 and into the baffle 18 where the mixture is ignited by an igniter device 22 which extends from the wall of the jet pipe 14 through the strut 17 into the baffle 18.

Another strut 17 houses a second fuel supply pipe 23 leading to a number of tubular ring manifolds 24 which have a number of apertures 25 delivering fuel into the exhaust gases.

There is also provided a combustion stabilizing device 27 for stabilising the combustion of fuel injected by injectors 25 within the jet pipe 14, and the combustion stabilising device is in this case supported from the casing 17a by three struts 26. The struts 26 provide paths for flame travel from the casing 17a to the combustion stabilising device 27.

The combustion stabilising device 27 (Figures 2 and 3) comprises an annular gutter member 28 of narrow V-section supported by the struts from the casing 17a to encircle the larger diameter end thereof.

The sides of the gutter member 28 diverge in the direction of gas flow through the jet-pipe 14 and the gutter member supports at its downstream end a series of ceramic elements 29 which alternate around the gutter member 28 with a series of catalytic combustion-promoting elements 30.

Each ceramic element 29 comprises a root portion 29a (Figure 2) which projects between the sides of the gutter member 28 and which has grooves in its surfaces into which shaped edges 28a (Figure 3) of the sides of member 28 engage, and a pair of radially-spaced circumferentially-extending axially-projecting flanges 29b.

Each of the combustion-promoting elements 30 is formed from metal gauze, expanded metal, or perforated sheet metal, the metal being platinum or a platinum alloy. The radially-spaced edges of the elements 30 are welded or otherwise rigidly secured to the downstream edges of the sides of the member 28. Suitable alloys for the elements comprise a platinum-rhodium alloy and a platinum-rhodium-thoria alloy. The platinum alloy may have other hardening substances, such as iridium, ruthenium, or osmium, added to it. One suitable form of platinum alloy contains 20% rhodium and has thoria added to reduce grain growth.

In the modified form of combustion stabilising device shown in Figure 4, each combustion-promoting element comprises two layers of the platinum or platinum alloy mesh or the like. One layer 30a is flat and is attached to the edges of the gutter member 28, and the second layer 30b is bent to arcuate form and extends between and is attached to the sides of the gutter member 28 so as to be spaced from the first layer 30a, the spacing preferably being maintained between the layers 30a and 30b by an internal wall 30c also of platinum alloy mesh or the like.

In the further modification shown in Figure 5, the flanges 29b have circumferential extensions 29c projecting over the edges of the elements 30, the extensions 29c abutting one another and having their upstream edges axially-spaced from the elements 30 as indicated at 31. The extensions 29c assist to reduce heat loss from the catalytic elements by reducing the velocity of the gas flowing over them as compared with the arrangement of Figure 3.

In Figure 6 the gutter 28 includes catalytic combustion-promoting elements 30d which may be spaced segments of platinum or platinum alloy gauze, which elements 30d are set back from the downstream edges of the sides of the gutter member 28 and are spaced away from the base of the V-section. Since the elements 30d are set well back from the edges of the gutter member the gas velocity over the elements will be low.

A similar arrangement is shown in Figure 7, but in this arrangement the catalytic elements 30d are separated from one another by metal pieces 32 extending from the circumferentially-spaced edges of the elements 30d to the base of the V-section gutter 28.

No ceramic elements are employed in the constructions of Figures 6 and 7.

In Figure 8, the stabilising device comprises a V-section annular member 128 with alternate ceramic blocks 129 and catalytic elements 130 housed within it so that the sides of the annular member 128 project downstream of the blocks 129 and elements 130. The blocks 130 are retained by grooving their surfaces to receive ridges 128a formed in the sides of the member 128.

In use, the combustion stabilising device 27 creates within its channel and on its downstream side a zone 32 in which the gas velocity is substantially reduced with respect to the gas velocity in the jet pipe and in which combustion of the fuel and combustion supporting gas in the exhaust gases is more easily initiated. Also, due to combustion on the surface of the catalytic elements, heat is absorbed by the elements 30 and they become very hot. The catalytic action of the hot elements 30 in promoting combustion markedly improves the relighting limits in the jet pipe 14 even under adverse conditions, such as low pressure, within the jet-pipe.

In the modification shown in Figure 4 the heat retained by the inner layer 30b helps to maintain the outer layer 30a sufficiently hot to promote catalytic action.

In the construction of Figures 5 to 8, the catalytic elements are set well back from the downstream edges of stabilising devices and are well shrouded from high velocity gases in the jet pipe 14, and best results are obtained with these constructions.

The ceramic elements are preferably formed from a material containing silicon carbide. Silicon carbide can be bonded, for example, with silicon nitride. This combination has good thermal shock properties and is robust.

Alternatively, the silicon carbide can be bonded with clay or in any other known manner. If desired, the silicon carbide can be sprayed with a coating of alumina to prevent oxidation, and also to prevent possible contamination of the platinum elements by silicon.

Another ceramic material which can be used for the elements 29 contains a ceramic with a proportion of metal, for example, a mixture of 80% alumina and 20% chromium. Chromium improves the shock properties.

I claim:

1. In combustion equipment of the class in which fuel is delivered to a combustion space through which combustion-supporting gas flows at high velocity, a combustion stabilizing device comprising a V-section member having sides diverging in the direction of gas flow through the combustion space and defining between them a channel open in the downstream direction, a series of platinum or platinum-containing alloy catalytic elements spaced apart along the length of the channel and extending across the channel between the sides thereof, and a corresponding series of ceramic elements supported by the V-section member and disposed in the spaces between the catalytic elements.

2. In combustion equipment, a combustion stabilizing device according to claim 1, said V-section member being annular and said catalytic elements and said ceramic elements alternating around the annular V-section member.

3. In combustion equipment, a combustion stabilizing device according to claim 1, said catalytic elements and said ceramic elements being housed within the channel of the V-section member and the sides of the V-section member projecting downstream of the catalytic elements and the ceramic elements.

4. A combustion stabilising device according to claim 1, wherein the catalytic element and the ceramic elements extend between the downstream edges of the sides of the V-section member and the ceramic elements have each a pair of flanges extending lengthwise of the channel and projecting downstream from the sides of the V-section member.

5. A combustion stabilising device according to claim 4, wherein the flanges of the ceramic elements have portions extending lengthwise of the channel over the edges of the catalytic elements, said portions being spaced in the direction of gas flow from the catalytic elements.

6. A combustion stabilising device according to claim 1, wherein the combustion-promoting elements are formed from gauze, or expanded metal, or perforated sheet.

7. A combustion stabilising device according to claim 1, having each catalytic element comprising spaced layers of foraminated platinum or platinum alloy material.

8. A combustion stabilising device according to claim 7, wherein one layer is flat and is attached to the edges of the V-section member and a second layer is arcuate and extends between and is attached to the sides of the V-section member so as to be spaced from said one layer.

9. A combustion stabilising device according to claim 8, comprising a further element of such foraminated material extending between and maintaining the spacing of the flat and arcuate layers.

10. In combustion equipment of the class in which fuel is delivered to a combustion space through which combustion-supporting gas flows at high velocity, a combustion stabilizing device comprising a V-section member having sides diverging in the direction of gas flow through the combustion space and defining between them a channel open in the downstream direction, a series of platinum or platinum-containing alloy catalytic elements spaced apart along the length of the channel and extending across the channel between the sides thereof, at a position set back from the downstream edge of the sides and spaced from the base of the V-section member.

11. In combustion equipment, a combustion stabilizing device according to claim 10, comprising also metal pieces extending from the edges of the catalytic elements to the base of the V-section member.

References Cited in the file of this patent

UNITED STATES PATENTS

| | | |
|---|---|---|
| 2,780,916 | Collins | Feb. 12, 1957 |
| 2,872,785 | Barrett et al. | Feb. 10, 1959 |

FOREIGN PATENTS

| | | |
|---|---|---|
| 386,320 | France | Apr. 9, 1908 |
| 1,161,852 | France | Mar. 31, 1958 |
| 696,756 | Great Britain | Sept. 9, 1953 |
| 706,698 | Great Britain | Apr. 7, 1954 |
| 735,570 | Great Britain | Aug. 24, 1955 |
| 753,175 | Great Britain | July 18, 1956 |